(12) United States Patent
Yamaguchi

(10) Patent No.: US 8,140,862 B2
(45) Date of Patent: Mar. 20, 2012

(54) MEMORY DEVICE

(75) Inventor: Ikuo Yamaguchi, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 863 days.

(21) Appl. No.: 11/740,451

(22) Filed: Apr. 26, 2007

(65) Prior Publication Data

US 2007/0266242 A1  Nov. 15, 2007

(30) Foreign Application Priority Data

May 11, 2006  (JP) ................................. 2006-132480

(51) Int. Cl.
*G06F 11/30* (2006.01)

(52) U.S. Cl. ......................... 713/193; 713/194; 713/189

(58) Field of Classification Search ........... 713/190–194
See application file for complete search history.

(56) References Cited

U.S. PATENT DOCUMENTS

| | | | | |
|---|---|---|---|---|
| 4,847,902 | A * | 7/1989 | Hampson ...................... | 713/190 |
| 5,726,930 | A * | 3/1998 | Hasegawa et al. ............ | 365/145 |
| 6,606,707 | B1 * | 8/2003 | Hirota et al. .................. | 713/172 |
| 7,363,491 | B2 * | 4/2008 | O'Connor ...................... | 713/166 |
| 2002/0136410 | A1 * | 9/2002 | Hanna ........................... | 380/277 |
| 2004/0093505 | A1 * | 5/2004 | Hatakeyama et al. ........ | 713/189 |
| 2004/0107355 | A1 * | 6/2004 | Sakurai et al. ................ | 713/193 |

FOREIGN PATENT DOCUMENTS

| | | |
|---|---|---|
| JP | 7-200485 | 8/1995 |
| JP | 2001-14441 | 1/2001 |
| JP | 2001-283165 | 10/2001 |
| JP | 2002-91828 | 3/2002 |
| JP | 2002-344438 | 11/2002 |
| JP | 2003-99332 | 4/2003 |
| JP | 2004-13744 | 1/2004 |
| JP | 2005-50320 | 2/2005 |
| JP | 2005-311877 | 11/2005 |

OTHER PUBLICATIONS

Office Action issued Aug. 10, 2010, in Japanese Patent Application No. JP2006-132480 (with English-language Translation).
Office Action issued Nov. 19, 2010 for Japanese Patent Application No. JP 2006-132480, with English Translation.

* cited by examiner

*Primary Examiner* — Edan Orgad
*Assistant Examiner* — Brian Olion
(74) *Attorney, Agent, or Firm* — Oblon, Spivak, McClelland, Maier & Neustadt, L.L.P.

(57) ABSTRACT

A memory device includes a storage unit having a decryption key storage section that stores key information for decryption and a data storage section that stores to-be-read data requested from the exterior, and a decryption control unit capable of decrypting an externally input encrypted read instruction and address based on the key information stored in the decryption key storage section, and causing data corresponding to the decrypted read instruction and address to be output from the data storage section. The decryption key storage section is composed of arrays of a flash memory.

8 Claims, 4 Drawing Sheets

MEMORY DEVICE

BACKGROUND OF THE INVENTION

1. Field of the Invention

The present invention relates to techniques of making it difficult to illegally copy data stored in a memory device.

2. Description of the Background Art

Various kinds of games have conventionally been provided in the form of game cartridges to home game machines. A typical game cartridge incorporates a mask ROM that stores information with wired logic, and stores application software and the like for implementing a prescribed game in the mask ROM. A wide variety of games are to be enjoyed by changing the game cartridge inserted in a game machine.

This type of game cartridges are vulnerable to illegal copying.

One method of reading data in a game cartridge is to analyze input and output signals to and from the game cartridge.

To prevent reading of data by such analyzing method, Japanese Patent Application Laid-Open No. 2002-091828 discloses a technique of encrypting input signals to a game cartridge and output signals from the game cartridge.

Encrypting input or output signals to or from a game cartridge as mentioned above requires key information about encryption or decryption to be stored beforehand in the game cartridge.

However, when the key information is stored in a mask ROM that stores information with wired logic in the cartridge, there are fears that the key information will be analyzed through analysis of a circuit structure of the mask ROM.

SUMMARY OF THE INVENTION

It is thus an object of the present invention to make it more difficult to illegally copy data stored in a memory device.

In a first aspect of the invention, a memory device receiving an encrypted read instruction and address from the exterior and outputting data corresponding thereto to the exterior includes: a first storage section that stores key information for decryption; a second storage section that stores to-be-read data requested from the exterior; and a decryption control unit capable of executing processing of decrypting an encrypted read instruction and address from the exterior based on the key information, and causing data corresponding to the decrypted read instruction and address to be output from the second storage section to the exterior. A circuit forming the first storage section, the second storage section, and the decryption control unit includes a circuit area having relatively low tamper resistance and a circuit area having relatively high tamper resistance. The first storage section is composed of the circuit area having relatively high tamper resistance.

According to the first aspect, because the encrypted read instruction and address is input to the memory device from the exterior, it is difficult to analyze data stored in the memory device by analyzing input signals to the memory device. Further, because the first storage section that stores key information is composed of the circuit area having relatively high tamper resistance, it is also difficult to obtain the key information by disassembling and reverse-engineering the memory device. This makes it difficult to illegally copy data stored in the memory device.

In a second aspect of the invention, a memory device receiving an encrypted read instruction and address from the exterior and outputting data corresponding thereto to the exterior includes: a first storage section that stores key information for decryption; a second storage section that stores to-be-read data requested from the exterior; and a decryption control unit capable of executing processing of decrypting an encrypted read instruction and address from the exterior based on the key information, and causing data corresponding to the decrypted read instruction and address to be output from the second storage section to the exterior. The first storage section is a charge-accumulating storage section.

According to the second aspect, because the encrypted read instruction and address is input to the memory device from the exterior, it is difficult to analyze data stored in the memory device by analyzing input signals to the memory device. Further, because the first storage section that stores key information is a charge-accumulating storage section, it is also difficult to obtain the key information by disassembling and reverse-engineering the memory device. This makes it difficult to illegally copy data stored in the memory device.

These and other objects, features, aspects and advantages of the present invention will become more apparent from the following detailed description of the present invention when taken in conjunction with the accompanying drawings.

DESCRIPTION OF THE PREFERRED EMBODIMENT

Preferred Embodiment

Figure 1:
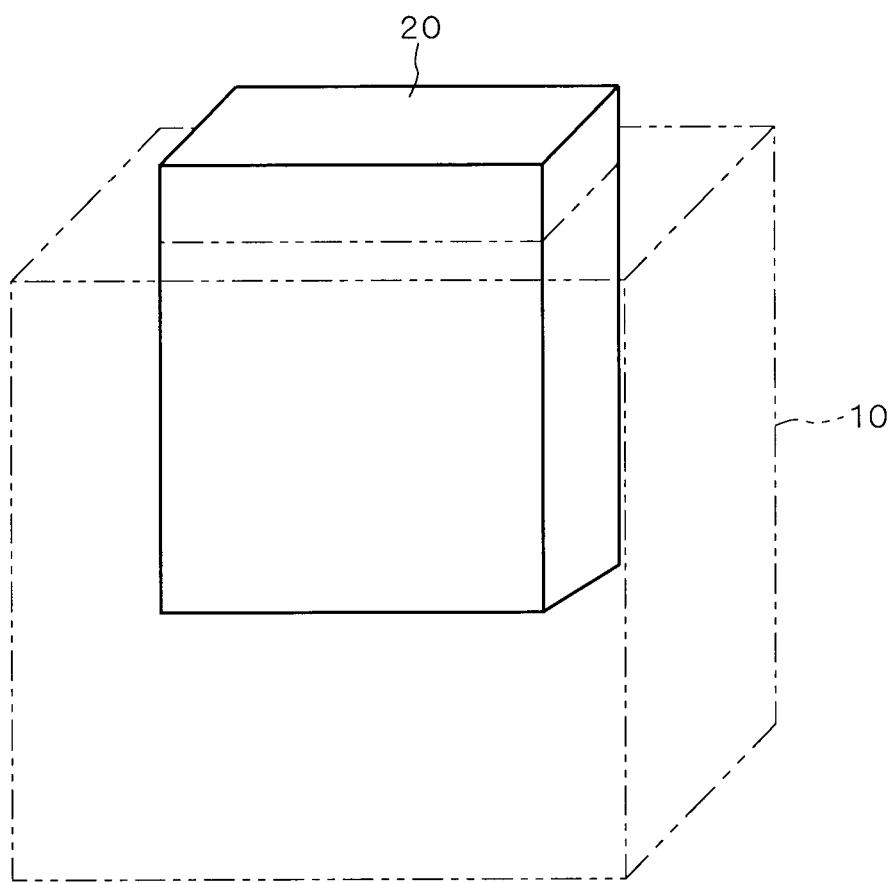
FIG. 1 shows a memory device and an information processing device according to a preferred embodiment of the invention.

A memory device according to a preferred embodiment of the invention will now be described. FIG. 1 shows an external view of a memory device 20.

The memory device 20 stores data therein, and is used as inserted in an information processing device 10. The data in the memory device 20 includes data for use in the information processing device 10. Examples of the data include data as application software to be implemented by the information processing device 10 which is a computer device, data used in the application software, and the like.

Data transmission is possible between the information processing device 10 and the memory device 20 being removably inserted in the information processing device 10. The information processing device 10 reads data from the memory device 20 in this state, to execute prescribed processing such as the application software.

Applied examples of the information processing device 10 and the memory device 20 include a game machine body such as a video game machine or mobile game machine and a game cartridge, a personal computer and a flash memory device connected to a USB terminal and the like of the personal computer, a mobile information terminal device such as a PDA (Personal Digital Assistant) and a memory device connected thereto, AV (Audio Visual) equipment and a memory device connected thereto, and the like.

The memory device 20 incorporates an electric circuit in a case body made of resin. The incorporated electric circuit implements various functions described later. Additionally, the memory device 20 has a connector area provided on one side thereof (e.g., the bottom in FIG. 1). Upon inserting the memory device 20 in the information processing device 10, terminals in the connector area on the memory device 20 side and terminals in a connector area on the information processing device 10 side are electrically connected. In this state, the information processing device 10 supplies power to the memory device 20 while sending a synchronizing signal to the memory device 20. This allows the information processing device 10 to input various instructions including a read instruction, an address and the like to the memory device 20, and allows the memory device 20 to output corresponding data to the information processing device 10.

Figure 2:
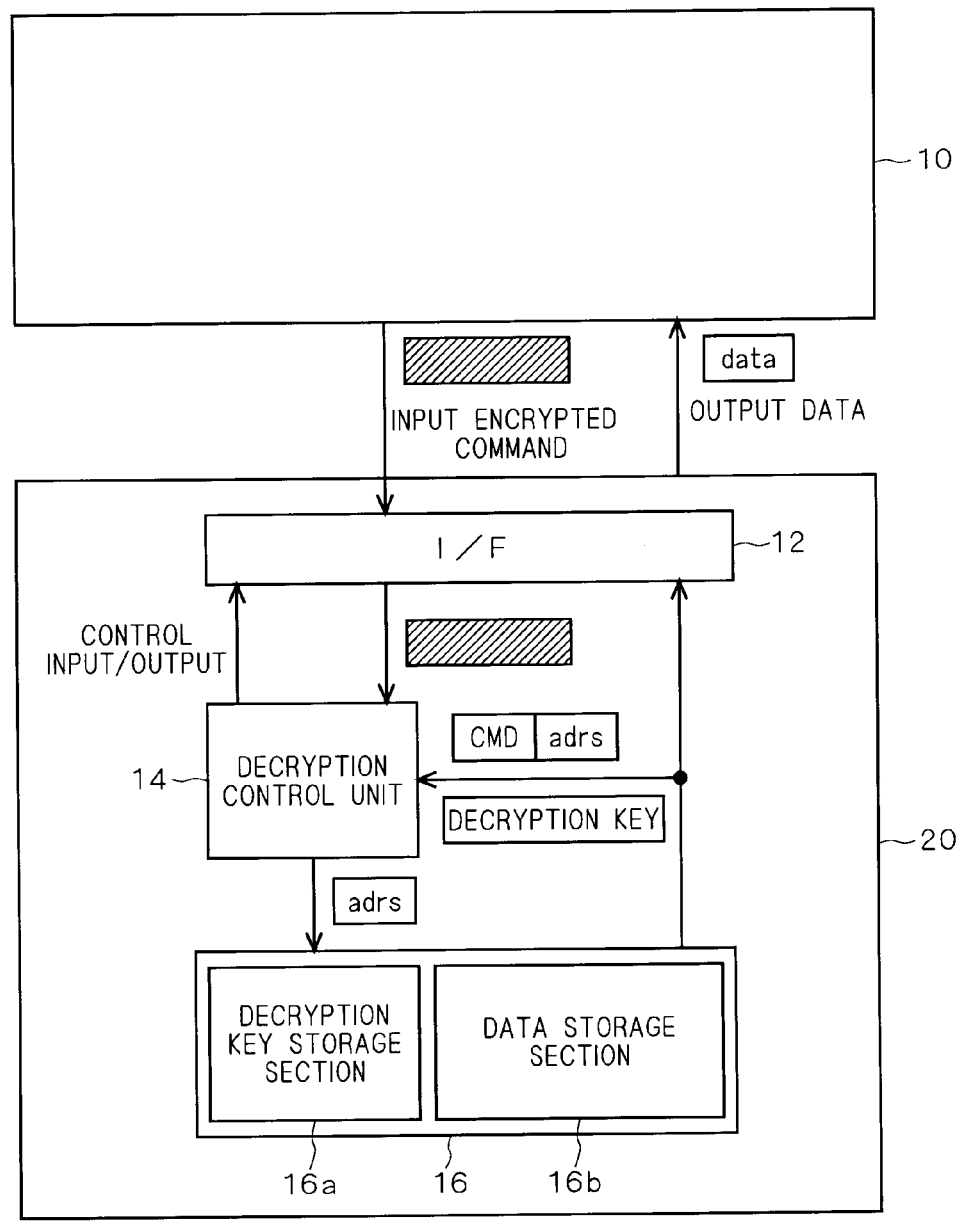
FIG. 2 is a block diagram of the memory device.

FIG. 2 is a functional block diagram of the memory device 20. Upon input of an encrypted command from the information processing device 10, the memory device 20 decrypts the command, and outputs data corresponding to the command.

The information processing device 10 is described. The information processing device 10 generates a command including a prescribed instruction and address, encrypts the command, and outputs the encrypted command to the exterior. The information processing device 10 supplies this encrypted command to the memory device 20, thus performing control such as reading and writing of data on the memory device 20. Specifically when reading prescribed data from the memory device 20, the information processing device 10 generates a command including a read instruction and an address of to-be-read data, encrypts the command, and outputs the encrypted command to the exterior, to supply the command to the memory device 20. The encryption is carried out by a predetermined scheme. A decryption key, which is key information for decrypting the encrypted command, is stored on the memory device 20 side.

The memory device 20 includes an interface unit 12, a decryption control unit 14, and a storage unit 16. The functions of these units are now described.

The interface unit 12 exchanges data with the information processing device 10 under control of the decryption control unit 14. In the illustrated embodiment, the command input from the information processing device 10 is supplied to the decryption control unit 14 through the interface unit 12, and data from the storage unit 16 is output to the exterior through the interface unit 12.

The storage unit 16 includes a decryption key storage section 16a as a first storage section that stores the decryption key, which is key information for decrypting the encrypted command, and a data storage section 16b as a second storage section that stores the to-be-read data requested from the exterior, i.e., from the information processing device 10. The storage unit 16 needs to be able to hold the various kinds of data even when the memory device 20 is out of the information processing device 10. To that end, the storage unit 16 is composed of memory arrays of a flash memory. The decryption key storage section 16a and the data storage section 16b may be composed of separate storage sections. For example, the decryption key storage section 16a may be composed of memory arrays of a flash memory and the data storage section 16b may be composed of arrays of a mask ROM and the like. In the illustrated embodiment, at least the decryption key storage section 16a is composed of memory arrays of a flash memory.

The decryption control unit 14 has the function of decrypting the externally input encrypted command, and causing data corresponding to the decrypted read instruction and address to be output from the storage unit 16.

The decryption processing on the encrypted command is predetermined in accordance with the encryption scheme on the information processing device 10 side. The decryption control unit 14 reads the decryption key stored in the storage unit 16, and decrypts the encrypted command in accordance with the predetermined decryption proceedings using the decryption key, thus obtaining a decrypted read instruction and address.

The decryption control unit 14 then assigns an address to the storage unit 16, causing data in the data storage section 16b of the storage unit 16 that corresponds to the address to be output. The data is output to the exterior through the interface unit 12, to be input to the information processing device 10. Namely, the decryption control unit 14 also functions as a memory controller that controls reading of data from the storage unit 16.

The decryption control unit 14 may be composed of a wired logic circuit designed to execute the above processing, or of a program control circuit in which a microprocessor (MPU) operates in accordance with a program stored in a storage unit. In the latter case, the program may be stored in a memory incorporated in the decryption control unit 14, or in a memory in the storage unit 16 or other external memories. In addition, the storage unit 16 and the decryption control unit 14 may be formed on separate IC chips, or may be integrated on a single IC chip.

The decryption key storage section 16a as the first storage section is rendered unreadable from the exterior. The unreadableness is attained as follows, for example: namely, the decryption key storage section 16a as the first storage section and the data storage section 16b as the second storage section that stores to-be-read data requested from the information processing device 10 are managed as the same address space by the decryption control unit 14 and the like. The decryption control unit 14 includes an address control circuit section that controls permission and prohibition of address assignment in a manner like the following: the address control circuit section has an address control circuit that permits the assignment of an address belonging to the decryption key storage section 16a for processing only inside the memory device 20, while prohibiting the assignment of an address belonging to the decryption key storage section 16a for other cases (e.g., when information on the assigned address is given to the exterior because an address belonging to the decryption key storage section 16a was assigned by a read command from the exterior), when executing decryption processing on an encrypted command and the like.

With such configuration, the decryption key stored in the decryption key storage section 16a can be rendered unreadable by an externally input command, thereby providing enhanced security.

Figure 3:
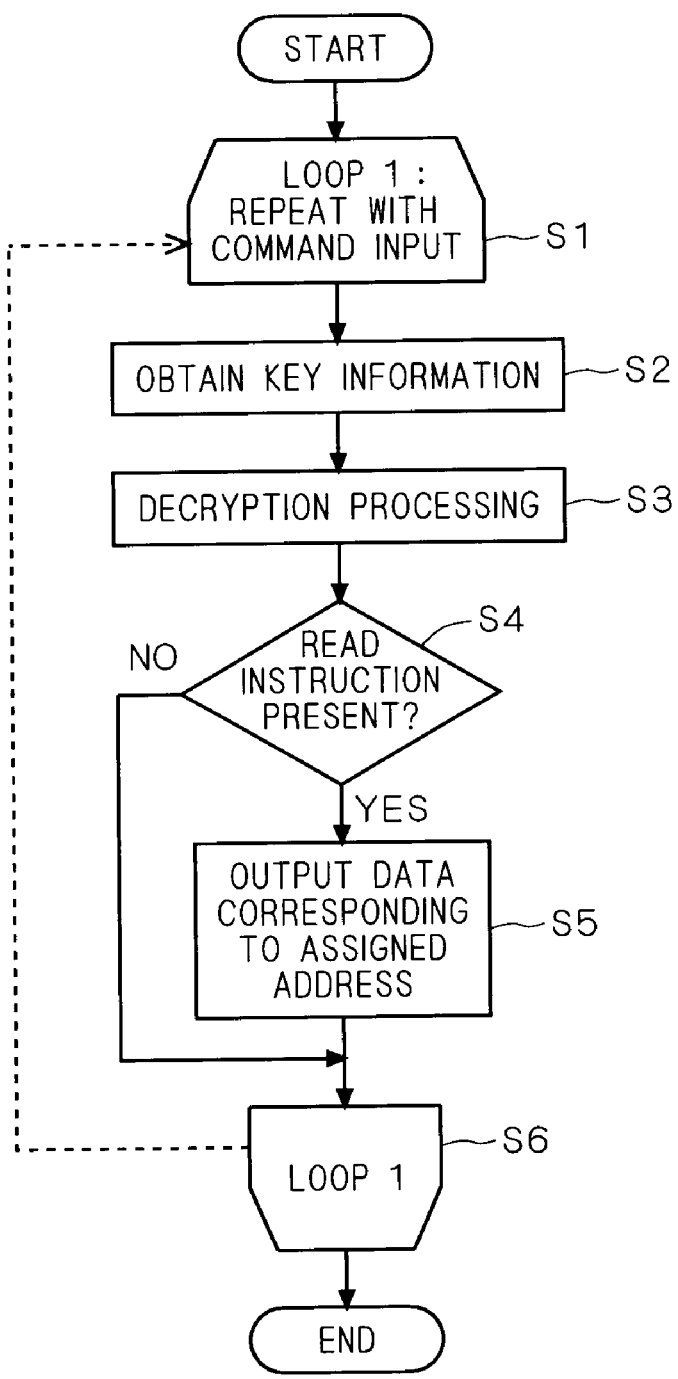
FIG. 3 is a flowchart explaining the operation of the memory device.

Referring to a flowchart shown in FIG. 3, the operation of the memory device 20 is described. In this operation, an encrypted read instruction and address is input from the exterior, and the memory device 20 outputs corresponding data to the exterior.

Upon input of a command from the exterior, loop 1 processing from step S1 to step S6 is executed. The loop 1 processing is executed repeatedly with command input. Namely, processing from step S2 to step S5 of the loop 1 is executed repeatedly as long as command input is repeated from the exterior, and the loop 1 processing is completed when command input ceases from the exterior.

In the first step S2 of the loop 1, the decryption control unit 14 reads a decryption key from the decryption key storage section 16a of the storage unit 16 (obtain key information).

In the next step S3, the decryption control unit 14 executes decryption processing on the input encrypted command using the decryption key (decryption processing). A decrypted instruction and address is thus obtained.

In the next step S4, the decryption control unit 14 determines whether the instruction is a read instruction. If the instruction is a read instruction, processing goes to step S5. In step S5, the decryption control unit 14 assigns an address to the data storage section 16b of the storage unit 16, causing data corresponding to the address to be output (output data corresponding to assigned address). The data is output to the exterior through the interface unit 12, to be input to the information processing device 10.

If it is determined that the instruction is not a read instruction in step S4, or after step S5 has been completed, the loop 1 processing (from steps S2 to S5) is repeated with input of the next command. In the absence of the next command input, the loop 1 processing is completed.

The instruction, if determined as not being a read instruction in step S4, can be a write instruction or other control instructions. Post-decryption processing for those instructions is identical to the operation of a typical memory device, and the description is thus omitted.

A target area of the write instruction is limited to the data storage section 16b as the second storage section. The decryption key storage section 16a as the first storage section is rendered unrewritable.

Because the read instruction and address is input as an encrypted command to the memory device 20, it is difficult to analyze data stored in the memory device 20 by analyzing input signals to the memory device 20. Further, because the decryption key storage section 16a that stores key information is composed of memory arrays of a flash memory, it is also difficult to obtain the key information by disassembling and reverse-engineering the memory device 20.

That is, for a decryption scheme with wired logic, its method of decryption processing can be analyzed by analyzing its logic circuit. On the other hand, for a flash memory that stores data by accumulating charge in each memory cell, it is difficult to analyze and obtain the contents of data by disassembling and observing the flash memory. Thus, storing key information in memory arrays of a flash memory makes it difficult to obtain the key information, thereby making it difficult to illegally copy the data stored in the memory device 20.

Even if key information can be analyzed, when each memory device 20 stores its own key information, the key information needs to be analyzed for each memory device 20. This makes it difficult to obtain cost-effectiveness in terms of relationship between the cost necessary for analysis and the effect obtained by illegally copying of the data. Illegal copying can be restrained in this aspect as well.

To generalize the above, a storage section suitable for key information storage should be composed of a circuit area that has relatively high tamper resistance. The term tamper resistance means analysis difficulty by physical reverse-engineering of a structure as hardware, and those skilled in the art can easily determine the degree of tamper resistance empirically, experimentally, and theoretically. For example, memory arrays of an EPROM (Erasable Programmable Read Only Memory), an EEPROM (Electrically Erasable Programmable Read Only Memory), a flash memory, an FeRAM, and the like have high tamper resistance compared to a wired logic circuit that performs prescribed logical operation, or a mask ROM having data written in the circuit itself. This is because while the proceedings and the contents of data can be analyzed relatively easily for a wired logic circuit or mask ROM by disassembling and observing the circuit itself, data cannot be analyzed for memory arrays of an EPROM, EEPROM, flash memory or FeRAM by such circuit observation.

The tamper resistance is even higher with a memory that employs multilevel techniques of controlling the amount of charge accumulated in one memory cell to thereby hold a plurality of electric conditions, NBIT techniques of accumulating charge in a plurality of portions of one memory cell to thereby hold a plurality of conditions in accordance with the charge accumulation conditions in the respective portions, or techniques combining these techniques, because it will be even more difficult to analyze their respective electric conditions.

The area of such memory having high tamper resistance is suitable for the key information storage. In fact, to obtain the above effect, the decryption key storage section 16a is not required to be a charge-accumulating storage section such as a flash memory, but may be composed of a circuit area having relatively high tamper resistance.

Relatively applying this concept to a circuit forming the storage unit 16 and the decryption control unit 14, the circuit should include a circuit area having relatively low tamper resistance and a circuit area having relatively high tamper resistance, with the decryption key storage section 16a being composed of the circuit area having relatively high tamper resistance. For example, the decryption control unit 14 is composed only of a wired logic circuit having relatively low tamper resistance or of a wired logic circuit and a mask ROM or flash memory, while the storage unit 16 is composed of arrays of an EPROM, EEPROM, flash memory, FeRAM, or the like. Another example is that the decryption key storage section 16a of the storage unit 16 is composed of arrays of a memory that employs the aforementioned NBIT techniques, multilevel techniques, or the like.

It should be appreciated that the above effect can be obtained by using arrays of a flash memory as the decryption key storage section 16a without having to consider the degree of tamper resistance as described above. Further, as a storage section that can be used as the key information storage while making it difficult to obtain the key information, not only arrays of a flash memory but various storage sections that store data by accumulating charge can be used. Examples of such storage section include memory arrays of an EPROM, EEPROM, or the like.

<Variation>

In the above preferred embodiment, an encrypted read instruction and address is input from the exterior, and data corresponding to the instruction and address is output. Yet it is not necessary to output all data through such processing.

That is, the decryption control unit 14 may operate by switching between an encryption mode and a normal mode. In the encryption mode, the decryption control unit 14 decrypts an externally input encrypted read instruction and address based on a decryption key, and causes data corresponding to the decrypted read instruction and address to be output from the data storage section 16b, as was described in the above preferred embodiment. The encryption mode is hereinafter also referred to as a security mode. In the normal mode, the decryption control unit 14 causes data corresponding to an externally input unencrypted read instruction and address to be output from the data storage section 16b to the exterior.

Figure 4:
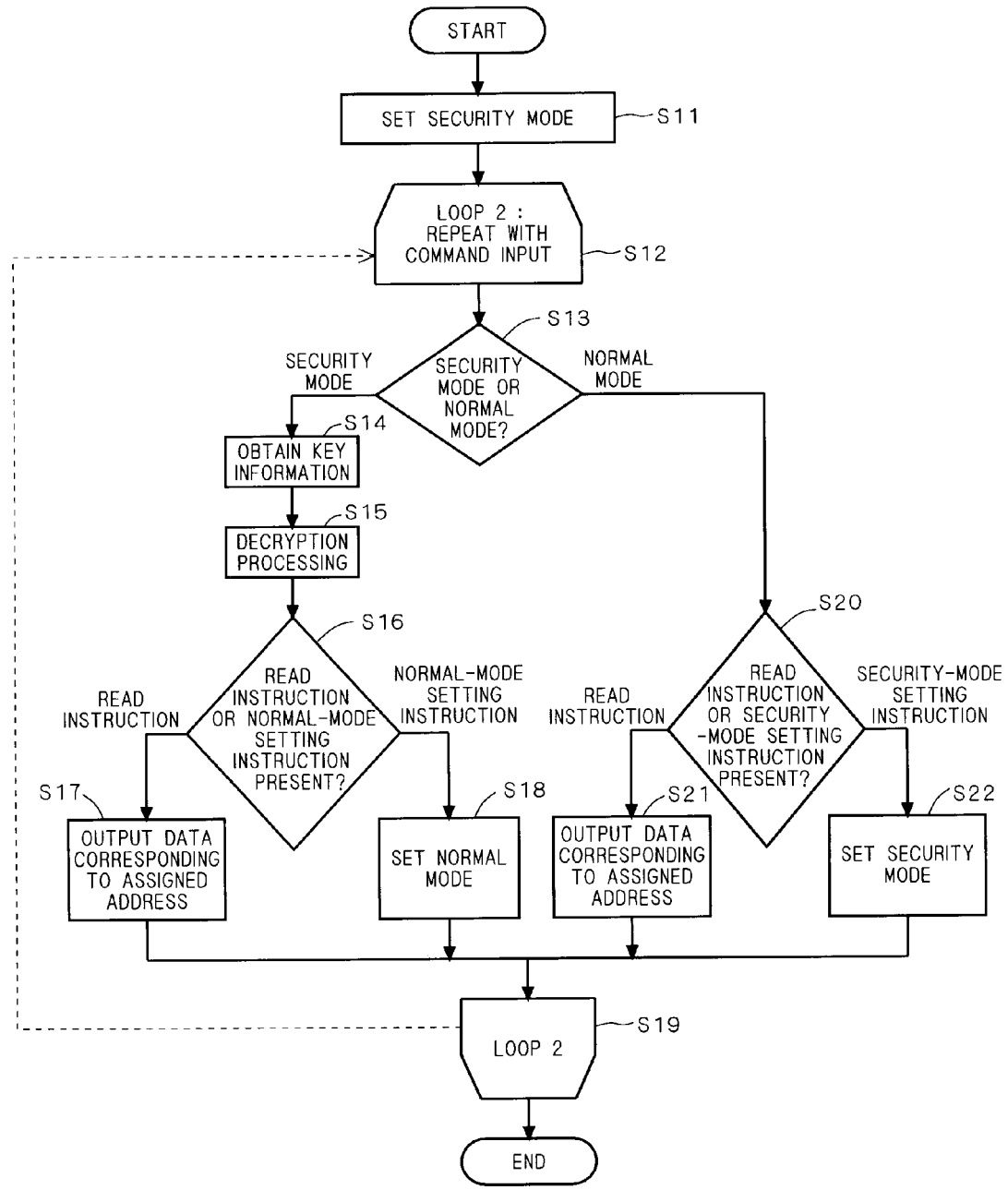
FIG. 4 is a flowchart explaining the operation of the memory device according to a variation of the invention.

Referring to a flowchart shown in FIG. 4, the above operation is described. The operation is based on the assumption that the information processing device 10 provides a security-mode setting instruction, and then outputs an encrypted read instruction and address to read data. Alternatively, the information processing device 10 provides a normal-mode setting instruction, and then outputs an unencrypted read instruction and address to output data.

Upon input of a command from the exterior to the memory device 20, the decryption control unit 14 in the memory device 20 sets a security mode in step S11 (set security mode). Namely, the memory device 20 is set to execute processing in the security mode in the initial state.

Then, loop 2 processing from step S12 to step S19 is executed. The loop 2 processing is executed repeatedly with command input. Namely, the loop 2 processing is executed repeatedly as long as command input is repeated from the exterior, and the loop 2 processing is completed when command input ceases from the exterior.

In the first step S13 of the loop 2, the decryption control unit 14 determines whether the mode is the security mode or normal mode. If it is determined that the mode is the security mode, processing goes to step S14.

In step S14, the decryption control unit 14 reads a decryption key from the decryption key storage section 16a of the storage unit 16 (obtain key information).

In the next step S15, the decryption control unit 14 executes decryption processing on the input encrypted command using the decryption key (decryption processing). A decrypted instruction and address is thus obtained.

In the next step S16, the decryption control unit 14 determines whether the instruction is a read instruction, normal-mode setting instruction, or other instructions. If the instruction is a read instruction, processing goes to step S17. In step S17, the decryption control unit 14 assigns an address to the data storage section 16b of the storage unit 16, causing data corresponding to the address to be output (output data corresponding to assigned address). The data is output to the exterior through the interface unit 12, to be input to the information processing device 10.

If the mode is determined to be the normal mode in step S13, the decryption control unit 14 sets the normal mode.

After step S17 or step S18 has been completed, or if it is determined that the instruction is not a read instruction or normal-mode setting instruction in step S16, the loop 2 processing is repeated with input of the next command. In the absence of the next command input, the loop 2 processing is completed.

Meanwhile, if the mode is determined to be the normal mode in the first step S13 of the loop 2, processing goes to step S20.

In step S20, the decryption control unit 14 determines whether the instruction is a read instruction, security-mode setting instruction, or other instructions. If the instruction is a read instruction, processing goes to step S21. In step S21, the decryption control unit 14 assigns an address to the data storage section 16b of the storage unit 16, causing data corresponding to the address to be output (output data corresponding to assigned address). The data is output to the exterior through the interface unit 12, to be input to the information processing device 10.

If the instruction is determined to be the security-mode setting instruction in step S20, the decryption control unit 14 sets the security mode.

After step S21 or step S22 has been completed, or if it is determined that the instruction is not a read instruction or security-mode setting instruction in step S20, the loop 2 processing is repeated with input of the next command. In the absence of the next command input, the loop 2 processing is completed.

The instructions, if determined as not being a read instruction or mode-setting instruction in step S16 and step S20, can be a write instruction or other control instructions. Processing for those instructions is identical to the operation of a typical memory device, and the description is thus omitted.

The memory device 20 of this configuration has the following advantages in addition to the effects obtained in the above preferred embodiment: namely, this memory device 20 is operable by switching between the encryption mode and normal mode, thereby executing security-oriented processing in the encryption mode and reading-speed-oriented processing in the normal mode that saves time required for decryption. In such ways, appropriate processing can be executed by setting a mode in accordance with the contents of to-be-read data, required reading speed, and the like.

In this variation, the data storage section 16b as the second storage section may be divided into two storage areas, one as a readable area in the encryption mode and the other as a readable area in the normal mode. This provides further enhanced security for data stored in the readable area in the encryption mode.

<Another Variation>

Although single contents for encryption processing in the information processing device 10 and a single decryption key are predetermined in the above preferred embodiment and variation, this is not a required condition. For example, the contents of encryption processing and decryption keys may be changed successively in a predetermined order. Alternatively, a plurality of decryption keys may be stored in the decryption key storage section 16a so that one of the keys is determined based on assignment information included in an encrypted command input to the memory device 20. Assignment information may be included in an encrypted command by additionally including the assignment information in the encrypted command or setting the whole encrypted command as the assignment information, to determine the decryption key from the command using a hash function.

Further, the encrypted command may be encrypted repeatedly. In such case, the memory device 20 repeats decryption processing in order on the repeatedly encrypted command using a plurality of predetermined decryption keys, or a plurality of decryption keys assigned by that encrypted command, thus obtaining an original instruction and address.

Moreover, while the data output from the memory device 20 is not subjected to any processing in the above preferred embodiment and variation, the output data may be subjected to encryption processing.

While the invention has been shown and described in detail, the foregoing description is in all aspects illustrative and not restrictive. It is therefore understood that numerous modifications and variations can be devised without departing from the scope of the invention.

What is claimed is:

1. A memory device receiving an encrypted read instruction and address from the exterior and outputting data corresponding thereto to the exterior, said memory device comprising:
   a first storage section that stores key information for decryption and stores said key information even when said memory device is out of an information processing device;
   a second storage section that stores to-be-read data requested from the exterior; and
   a decryption control unit capable of executing processing of decrypting an encrypted read instruction and address from the exterior based on said key information, and causing data corresponding to the decrypted read instruction and address to be output from said second storage section to the exterior, wherein a circuit forming said first storage section, said second storage section, and said decryption control unit includes a first circuit area having tamper resistance and a second circuit area having a relatively higher tamper resistance compared to the first circuit area, said first storage section is composed of said circuit area having relatively higher tamper resistance, wherein said second storage section includes first and second distinct storage areas within said second storage section, and said decryption control unit is operable by switching between an encryption mode that is set when an externally input encrypted read instruction and address is input and a normal mode that is set when an externally input unencrypted read instruction and address is input in response to a setting instruction, and further wherein said decryption control unit executes said processing of decrypting the externally input encrypted read instruction and address based on said key information, and causes data corresponding to the decrypted read instruction and address to be output from said first storage area of said second storage section to the exterior in said encryption mode, and executes processing causing data corresponding to the externally input unencrypted read instruction and address to be output from said second storage area of said second storage section to the exterior in said normal mode.

2. The memory device according to claim 1, wherein said second storage section is also composed of said circuit area having relatively high tamper resistance.

3. The memory device according to claim 1, wherein a storage area of said first storage section and a storage area of said second storage section are managed as a single address space, and said storage area of said first storage section is unreadable from the exterior.

4. A memory device receiving an encrypted read instruction and address from the exterior and outputting data corresponding thereto to the exterior, said memory device comprising:

a first storage section that stores key information for decryption and stores said key information even when said memory device is out of an information processing device;

a second storage section that stores to-be-read data requested from the exterior; and a decryption control unit capable of executing processing of decrypting an encrypted read instruction and address from the exterior based on said key information, and causing data corresponding to the decrypted read instruction and address to be output from said second storage section to the exterior, wherein said first storage section is a charge-accumulating storage section, wherein said second storage section includes first and second distinct storage areas within said second storage section, and said decryption control unit is operable by switching between an encryption mode that is set when an externally input encrypted read instruction and address is input and a normal mode that is set when an externally input unencrypted read instruction and address is input in response to a setting instruction, and further wherein said decryption control unit executes said processing of decrypting the externally input encrypted read instruction and address based on said key information, and causes data corresponding to the decrypted read instruction and address to be output from said first storage area of said second storage section to the exterior in said encryption mode, and executes processing causing data corresponding to the externally input unencrypted read instruction and address to be output from said second storage area of said second storage section to the exterior in said normal mode.

5. The memory device according to claim 4, wherein said second storage section is also a charge-accumulating storage section.

6. The memory device according to claim 4, wherein said decryption control unit includes a wired logic circuit that executes said processing.

7. The memory device according to claim 4, wherein said decryption control unit includes a program control circuit that executes said processing.

8. The memory device according to claim 4, wherein a storage area of said first storage section and a storage area of said second storage section are managed as a single address space, and said storage area of said first storage section is unreadable from the exterior.

* * * * *